(12) United States Patent  
Tsubaki (10) Patent No.: US 7,588,330 B2  
(45) Date of Patent: Sep. 15, 2009

(54) INK-JET RECORDING METHOD

(75) Inventor: Yoshinori Tsubaki, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 161 days.

(21) Appl. No.: 11/560,908

(22) Filed: Nov. 17, 2006

(65) Prior Publication Data

US 2007/0120881 A1     May 31, 2007

(30) Foreign Application Priority Data

Nov. 25, 2005   (JP)   ............................... 2005-339888

(51) Int. Cl.  
   *B41J 2/01*   (2006.01)
(52) U.S. Cl. .................. 347/102; 347/95; 347/100; 347/101
(58) Field of Classification Search .................. 347/102  
See application file for complete search history.

(56) References Cited

U.S. PATENT DOCUMENTS

| 5,537,137 | A | * | 7/1996 | Held et al. ................... 347/105 |
| 6,328,404 | B1 | * | 12/2001 | Fujimori ....................... 347/15 |
| 2002/0118251 | A1 | * | 8/2002 | Chang et al. ................... 347/43 |
| 2003/0234848 | A1 | * | 12/2003 | Ishikawa ..................... 347/102 |
| 2004/0141041 | A1 | * | 7/2004 | Tsutsumi et al. ............. 347/102 |

\* cited by examiner

*Primary Examiner*—Matthew Luu  
*Assistant Examiner*—Brian J Goldberg  
(74) *Attorney, Agent, or Firm*—Lucas & Mercanti, LLP (57) ABSTRACT

An ink-jet recording method which enables recording of precise images by using a photo-curable ink and an ink-jet recording apparatus is disclosed, comprising ejecting an ink from a recording head to form ink dots on a recording medium, and exposing the recording medium to an actinic ray, wherein at least one of the timing of ejecting the ink and the rate of conveying recording medium is controlled so that the number of ink dots per unit length is greater in the sub-scanning direction than in the main scanning direction.

7 Claims, 1 Drawing Sheet

FIG. 1

INK-JET RECORDING METHOD

This application claims priority from Japanese Patent Application No. JP2005-339888 filed on Nov. 25, 2005, which is incorporated hereinto by reference.

FIELD OF THE INVENTION

The present invention related to an ink-jet recording method and in particular to an ink-jet recording method rendering it feasible to obtain highly precise images at a relatively high speed, specifically with respect to printing mediums exhibiting ink non-absorptivity. The invention also relates to an ink-jet ink for use in the recording method.

BACKGROUND OF THE INVENTION

Ink-jet recording methods enable highly precise image recording by using a relatively simple apparatus and has achieved rapid progress in various fields. The use thereof ranges widely and a recording medium or inks suitable for the individual purpose are employed.

Recently, marked enhancement of recording speed has been achieved and there have been developed printers suitable for short printing runs.

However, special ink-jet paper is needed to derive the best performance of an ink-jet printer.

Recording on coated paper or art paper which exhibits little ink-absorptivity or on plastic resin film exhibiting no absorptivity produces problems such as chromatic bleeding in which different color inks are mixed on the recording medium, easily causing color contamination, which has become a problem to be solved to enable use of a variety of recording media for ink-jet recording.

Proposed to solve the foregoing problem was an ink-jet ink, which was curable upon exposure to ultraviolet rays, as disclosed in U.S. Pat. No. 4,228,438. There was also proposed a non-aqueous ink which contained an indispensable pigment and a polyacrylate having a valence of 3 or more as a polymerizable material and also contained a ketone or an alcohol as a main solvent, as disclosed in JP-B No. 5-64667 (hereinafter, the term JP-A refers to Japanese Patent Application Publication).

There was also proposed an ink using an aqueous ultraviolet-polymerizable monomer, as disclosed in JP-A No. 7-224241 (hereinafter, the term JP-A refers to Japanese Patent Application Publication). This ink, which was curable by a curing component, was able to record even onto a non-absorptive medium but contained a large amount of a curing component other than the colorant. This component was non-volatile so that ink dots rose on the recording surface, resulting in unnatural image quality, specifically in glossiness.

To reduce this unnaturalness, reduction of the ink quantity ejected from the recording head was proposed but it resulted in a reduced dot diameter formed by a single droplet, and requiring marked enhancement of recording resolution.

As a means for enhancing recording resolution, for instance, it is theoretically feasible to increase the number of ink dots deposited on a recording medium, per unit length by increasing the number of nozzles in the recording head per unit length, however, it requires extremely precise techniques to manufacture such a recording head, producing problems such as increased manufacturing cost. Marked acceleration of the timing of ejection by a recording head is also theoretically feasible, which is technically difficult under current situations.

Even if high resolution recording is achieved, the use of conventional inks was unable to overcome unnaturalness in glossiness of both the image area and a white background.

SUMMARY OF THE INVENTION

Accordingly, the present invention has come into being in light of the foregoing problems.

It is an object of the invention to provide an ink-jet recording method which enables recording of precise images by using a photo-curable ink even onto a recording medium exhibiting poor ink absorptivity, without increasing the nozzle number of a recording head or without greatly quickening the timing of ejection of the recording head.

It is another object of the invention to provide an ink-jet ink suitable for the recording method.

One aspect of the invention is directed to an ink-jet recording method using an ink-jet recording apparatus, the method comprising the steps of:

ejecting droplets of an ink-jet ink from a recording head to deposit the droplets onto a recording medium to form ink dots, and exposing the recording medium to an actinic ray, wherein the ink-jet ink comprises a colorant, water and a polymeric compound which is comprised of a hydrophilic backbone chain having plural side chains and is capable of curing via the side chains upon exposure to an actinic ray, the ink-jet recording apparatus is provided with at least one recording head having plural nozzles which eject the ink and are arranged in a main scanning direction, a light source to expose the recording medium to the actinic ray and a recording medium conveyance mechanism to convey the recording medium in the sub-scanning direction, and wherein the ink-jet recording apparatus is further provided with a control section to control the recording head and the recording medium conveyance mechanism, and the control section controls at least one of a timing of ejecting the droplets of the ink from the recording head and a rate of conveying the recording medium in the sub-scanning direction so that the number of ink dots per unit length is greater in the sub-scanning direction than in the main scanning direction.

Another aspect of the invention is directed to an ink-jet ink usable in the foregoing ink-jet recording method.

DETAILED DESCRIPTION OF THE INVENTION

The polymeric compound of the invention, which is comprised of a hydrophilic backbone chain (which is hereinafter denoted simply as a hydrophilic backbone) having plural side chains and is capable of curing or cross-linking via the side chains (which is hereinafter also denoted as an actinic energy ray-curing polymeric compound) is a hydrophilic resin selected from the group of a saponified polyvinyl acetate, polyvinyl acetal, polyethylene oxide, polyalkylene oxide, polyvinyl pyrrolidone, polyacrylamide, polyacrylic acid, hydroxyethyl cellulose, methyl cellulose, hydroxypropyl cellulose, derivatives of the foregoing hydrophilic resins and their copolymers, in which at least one modifying group, such as a photo-dimerizable group, a photo-degradable group, a photo-polymerizable group, a photo-modifying group or a photo-depolymerizable group. Of these modifying groups, a photo-polymerizable group (or photo-crosslinking group, i.e., a group capable of curing (or crosslinking) through photopolymerization upon exposure to an actinic ray) is preferred in terms of performance of the formed image.

A preferred combination exists between ionicity of a colorant and ionicity of the side chains of the polymeric compound. It was proved that the combination of an anionic colorant with nonionic or anionic side chains resulted in superiority in image fastness, storage stability and continuous ejectability of the ink. Anionic side chains are specifically preferred. The reason therefor is not clear but it is assumed that the foregoing ionic combination results in reduction in decomposition or association of the ink composition, possibly leading to advantageous effects, as described above.

The structure composed of a hydrophilic backbone and a side chain of the actinic ray curing polymeric compound of the invention is represented preferably by the following formula (A):

Poly-$\{(X_1)_m$—[B—$(Y_1)_n]_p\}$      formula (A)

In the formula (A), designation "Poly" represents a hydrophilic backbone and is preferably a saponified polyvinyl acetate, polyvinyl acetal, polyalkylene oxide including a polyethylene oxide, polyvinyl pyrrolidone, polyacrylamide, polyacrylic acid, hydroxyethyl cellulose, methyl cellulose, hydroxypropyl cellulose, derivatives of the foregoing resins and their copolymers.

The designation, $\{(X_1)_m$—[B—$(Y_1)_n]_p\}$ represents side chains. In the side chains, $X_1$ represents a (p+1)-valent linkage group, m is 0 or 1, and "p" represents an integer and preferably an integer of 1 to 5. Specifically, when p is 1, $X_1$ is a divalent linkage group and examples thereof include an alkylene group, an arylene group, a heteroarylene group, an ether group, a thioether group, an imino group, an ester group, an amide group, and a sulfonyl group, provided that these groups may be combined with each other to form a di- or more valent group. When p is 2 or more, plural Bs or $Y_1$s may be the same or different. $X_1$ is preferably an alkyleneoxy group or a di- or more-valent linkage group combined with an aromatic group.

B represents a curing group and specifically a group containing a double bond or a triple bond. Examples thereof include an acryl group, a methacryl group, a vinyl group, an allyl group, a diazo group, and an azido group. Of these, an acryl group or a methacryl group is preferred.

$Y_1$ represents a hydrogen atom or a substituent. Specific examples of a substituent include a halogen atom (e.g., fluorine atom, chlorine atom), an alkyl group (e.g., methyl, ethyl butyl, pentyl, 2-methoxyethyl, trifluoromethyl, 2-ethylhexyl, cyclohexyl), an aryl group (e.g., phenyl, p-tolyl, naphthyl), an acyl group (e.g., acetyl propionyl, benzoyl), an alkoxy group (e.g., methoxy, ethoxy, butoxy), an alkoxycarbonyl group (e.g., methoxycarbonyl, 1-propoxycarbonyl), an acyloxy group (e.g., acetyloxy, ethylcarbonyloxy), a carbamoyl group (e.g., methylcarbamoyl, ethylcarbamoyl, butylcarbamoyl, phenylcarbamoyl), a sulfamoyl group (e.g., sulfamoyl, methylsulfamoyldimethylsulfamoyl, phenylsulfamoyl), an alkylthio group (e.g., methylthio, ethylthio, octylthio), an arylthio group (e.g., phenylthio, p-tolythio), an alkylureido group (e.g., methylureido. ethylureido, methoxyureido, dimethylureido), an arylureido group (e.g., phenylureido), an alkylsulfonamido group (e.g., methanesulfonamide, ethanesulfonamide, butanesulfonamide. trifluoromethylsulfonamide, 2,2,2-trifluoroethylsulfonamido), an arylsulfonamido group (e.g., phenylsulfonamide, tolylsulfonamido), an alkylaminosulfonylamino group (e.g., methylaminosulfonylamino, ethylaminosulfonylamino), an arylaminosulfonylamino group (e.g., phenylaminosulfonylamino), hydroxyl group, and a heterocyclic group (e.g., pyridyl, pyrazolyl, imidazolyl, furyl, thienyl). These groups may be substituted.

In the formula, m is 0 or 1, and n is 0 or 1.

The hydrophilic backbone is preferably a saponified polyvinyl acetate in terms of easiness of introducing the side chains and handling. The saponified polyvinyl acetate preferably exhibits a polymerization degree of 300 to 4000 (more preferably 500 to 2000) and a saponification degree of 77% to 99% in terms of handling. The saponified polyvinyl acetate, which is also called polyvinyl alcohol, is represented as below:

Polymerization degree: m+n

Saponification degree: $[m/(m+n)] \times 100 (\%)$ where m+n represents a polymerization degree, while $[m/(m+n)] \times 100$ represents a saponification degree.

Preferably, the saponified polyvinyl acetate is modified by introducing side chains as a modifying group, which is therefore also denoted as a modified polyvinyl alcohol. Such a modified, saponified polyvinyl acetate (or modified polyvinyl alcohol) preferably exhibits a modification ratio of the side chains to the backbone of 0.5 to 4 mol % and more preferably from 0.6 to 1.5 mol % in terms of reactivity. A modification ratio of less than 0.5 mol % results in insufficient curing (or crosslinking), leading to reduced targetted effects of the invention. A modification ratio of more than 4 mol % results in excessively increased curing density and formation of a brittle film, leading to decreased film strength. The modification ratio of the side chains to the backbone is defined by a molar ratio (expressed in mol %) of the side chain introduced to the hydrophilic backbone, which is illustrated as above by —[CH$_2$—CH(OH)]$_m$—.

Of the actinic ray curing polymeric compounds of the invention, a light-sensitive resin described in JP-A No. 56-67309 is cited as a further preferred structure. The light-sensitive resin composition described in JP-A No. 56-67309 is a resin composition having a side chain of a 2-azido-5-nitrophenylcarbonyloxyethylene structure (which is anionic) represented by the following formula (1) or a side chain of 4-azido-3-nitrophenylcarbonyloxyethylene structure (which is nonionic) represented by the following formula (2):

formula (1)

-continued formula (2)

Further, a side chain of a modifying group (anionic), represented by the following formula (3) is also preferred:

formula (3)

wherein R is an alkylene group or an aromatic ring, and preferably a benzene ring.

A (nonionic) resin described in JP-A Nos. 2000-181062 and 2004-189841, represented by the following formula (4) is also preferred as a photopolymerizable modifying group, in terms of reactivity:

formula (4)

wherein $R_2$ represents —$CH_3$ (methyl) or H; n is 1 or 2; X represents —$(CH_2)_m$—COO— or —O—; Y represents an aromatic ring or a single bond; and m is an integer of 0 to 6.

A (nonionic) photopolymerizable modifying group described in JP-A No. 2004-161942, represented by the following formula (5) is preferably usable in conventionally known water-soluble resin:

formula (5)

wherein $R_3$ represents methyl (—$CH_3$) or H; and $R_4$ represents a straight chain or branched alkylene group.

Modifying groups (nonionic) represented by the following formulas (6) to (8) are also preferred:

formula (6)

formula (7)

formula (8)

Such an actinic ray-curing resin is contained preferably in an amount of 0.5% to 5.0% by weight, based on the total amount of the ink. A content of 0.5% or more results in enhanced curing efficiency and a rapid increase of an ink viscosity after curing leads to an improvement in beading or color-bleeding. A content of not more than 5.0% by weight, which renders it difficult to adversely affect physical properties of the ink or the state of the interior of an ink head, is preferred in terms of ejectability and storage stability of the ink.

In the actinic ray curing type resin of the invention, the backbones having a certain degree of polymerization is further cured through crosslinking between side chains, leading to a marked increase in molecular weight per photon, as compared to an actinic ray curing type resin which is formed by polymerization via conventional chain reaction. In commonly known actinic ray curing resins, control of the number of curing points is not feasible so that physical properties of cured film are uncontrollable, resulting in formation of fragile hard film. On the contrary, in the resin of the invention, the number of curing (or crosslinking) points can be controlled by the length of the hydrophilic backbone and introduction of side chains, rendering it feasible to control physical properties of the ink membrane corresponding to the object of the invention.

In a commonly known actinic ray curing type ink, most of the content of the ink is accounted for by curing components except for the colorant, causing cured ink dots to rise, leading to inferior image quality, for instance, in glossiness. On the contrary, the resin of the invention can be used at the relatively small amount necessary to form a dot-image and evaporative components account for a large content, achieving superior fixability and enhanced image quality after being dried.

In one preferred embodiment of the invention, there are employed photopolymerization initiators or photosensitizers. These compounds may be dissolved or dispersed in solvents, or may be chemically bonded to a photosensitive resin. Applicable photopolymerization initiators and photosensitizers are not specifically limited but commonly known ones are usable, and water-soluble compounds are preferable in terms of miscibility and reaction efficiency. Specifically, 4-(2-hydroxyethoxy)phenyl-(2-hydroxy-2-propyl)ketone (or HMPK), thioxanthon ammonium salt (or QTX) and benzophenone ammonium salt (or ABQ) are preferred in terms of miscibility with aqueous solvents.

Further, compounds represented by the following formula (9), specifically 4-(2-hydroxyethoxy)phenyl-(2-hydroxy-2-propyl)ketone (n=1, HMPK) and its ethylene oxide adduct (n=2-5) are more preferred:

formula (9)

wherein n is an integer of 1 to 5.

Furthermore, examples of other preferred photopolymerization initiators include benzophenones such as hydroxybenzophenone, bis-N,N-dimethylaminobenzophenone, bis-N,N-diethylaminobenzophenone and 4-methoxy-4'-dimethylaminobenzophenone; thioxanthones such as thioxanthone, 2,4-diethylthioxantone, isopropylthioxantone, chlorothioxanthone and isopropoxychlorothioxanthone; anthraquinones such as ethylanthraquinone, aminoanthraquinone, and chloroanthraquinone; acetophenones; benzoin ethers such as benzoin methyl ether; 2,4,6-trihalomethyltriazines; 1-hydroxycyclohexylphenyl ketone; 2,4,5-triarylimidazole dimmers such as 2-(o-chlorophenyl)-4,5-diphenylimidazole dimmer, 2-(o-chlorophenyl)-4,5-di-(m-methoxyphenyl)imidazole dimmer, 2-(o-fluorophenyl)-4,5-diphenylimidazole dimmer, 2-(o-methoxyphenyl)-4,5-diphenylimidazole dimmer, 2-(p-methoxyphenyl)-4,5-diphenylimidazole dimmer, 2-di(p-methoxyphenyl)-5-phenylimidazole dimmer and 2-(2,4-dimethoxyphenyl)-4,5-diphenylimidazole dimmer; benzyl dimethyl ketal, 2-2-benzyl-2-dimethylamino-1-(4-morpholinophenyl)butane-1-one, 2-methyl-1-[4-(methylthio)phenyl]-2-morpholino-1-propane, 2-hydroxy2-methyl-1-phenyl-propane-1-one, 1-[4-(2-hydroxyethoxy)-phenyl]-2-hydroxy-2-methyl-propane-1-one, phenanthrene, 9,10-phenthrenequinone; benzoins such as methylbenzoin and ethylbenzoin; acridine derivatives such as 9-phenylacridine and 1,7-bis(9,9'-acridinyl)heptane; bisacylphosphine oxide; and mixtures of the foregoing compounds. These compounds may be used alone or in combination.

In addition to these photopolymerization initiators, accelerators may be incorporated. Examples thereof include ethyl p-dimethylaminobenzoate, isoamyl p-dimethylaminobenzoate, ethanolamine, diethanolamine and triethanolamine.

Of the foregoing photopolymerization initiators, those which are comprised of a hydrophilic backbone grafted by side chains, are also preferred.

The actinic energy rays of the invention include, for example, an electron beam, an ultraviolet ray, α-ray, β-ray, γ-ray, and X-rays. Of these, an electron beam and an ultraviolet ray are preferable in terms of human safety, ease of handling and industrial availability.

When exposed to an electron beam, the dosage of the exposed electron beam is desirably within the range of 0.1 to 30 Mrad. A dosage of less than 0.1 Mrad cannot effectuate sufficient exposure and a dosage of more than 30 Mrad possibly deteriorates the support.

When exposed to ultraviolet rays, commonly known light sources are used, such as low-pressure, medium-pressure and high-pressure mercury lamps having an operation pressure within the range of 0.1 kPa to 1 MPa, metal halide lamps, xenon lamps exhibiting emission within the ultraviolet wavelength region, cold cathodes tube and thermal cathode tubes and LED.

Exposure to an actinic ray is preferably within the range of 0.001 to 1.0 see and more preferably 0.001 to 0.5 sec. after being ink-deposited. It is essential for precise image formation that exposure timing is as soon as possible.

A basic method for exposure of actinic rays is disclosed in JP-A No. 60-132767. Specifically, light sources are provided on both sides of a head unit, and the head and the light sources are made to scan through a shuttle system. Exposure is performed at an interval after ink deposition. Curing is completed by another undriven light source. U.S. Pat. No. 6,45,979 discloses an exposure method using an optical fiber and an exposure method in which collimated light strikes the mirror surface provided on the side a head unit, thereby exposing a printed section to UV light. Either of the foregoing methods are applicable to the image forming method of the invention.

In one preferred embodiment, exposure to an actinic ray is separated into two stages. Exposure to an actinic ray is conducted within 0.001 to 2.0 sec after ink deposition, followed by exposure to an actinic ray. Separation of exposure to two stages can prevent shrinkage of recording material which tends to occur in the ink curing stage.

Various kinds of dyes and pigments known in ink-jet recording can be employed as colorants used for the ink-jet ink of the invention. Colorants usable in the invention are preferably anionic ones in terms of the combination with ionicity of the side chain of an actinic ray curing resin.

Dyes usable in the invention are not specifically limited and include, for example, acid dyes, direct dyes, water-soluble dyes such as reactive dyes and disperse dyes, and anionic dyes are preferable.

Anionic water-soluble dyes usable in the invention include, for example, azo dyes, methine dyes, azomethine dyes, xanthene dyes, quinone dyes, phthalocyanine dyes, triphenylmethane dyes and diphenylmethane dyes. Examples of specific compounds thereof are shown below but are not limited to these.

C.I. Acid Yellow:
 1, 3, 11, 17, 18, 19, 23, 25, 36, 38, 40, 42, 44 ,49, 59, 61, 65 ,67, 72, 73, 79, 99, 104, 110, 114, 116, 118, 121, 127, 129, 135, 137, 141, 143, 151, 155, 158, 159, 169, 176, 184, 193, 200, 204, 207, 215, 219, 220, 230, 232, 235, 241, 242, 246;

C.I. Acid Orange:
 3, 7, 8, 10, 19, 24, 51, 56, 67, 74, 80, 86, 87, 88, 89, 94, 95, 107 108 116, 122, 127, 140, 142, 144, 149, 152, 156, 162, 166, 168;

C.I. Acid Red:
 88, 97, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, 415;

C.I. Acid Violet:
 17, 19, 21, 42, 43, 47, 48, 49, 54, 66, 78, 90, 97, 102, 109, 126;

C.I. Acid Blue:
 1, 7, 9, 15, 23, 25, 40, 62, 72, 74, 80, 83, 90, 92, 103, 104, 112, 113, 114, 120, 127, 128, 129, 138, 140, 142, 156, 158, 171, 182, 185, 193, 199, 201, 203, 204, 205, 207, 209, 220, 221, 224, 225, 229, 230, 239, 249, 258, 260, 264, 278, 279, 280, 284, 290, 296, 298, 300, 317, 324, 333, 335, 338, 342, 350;

C.I. Acid Green:
9, 12, 16, 19, 20, 25, 27, 28, 40, 43, 56, 73, 81, 84, 104, 108, 109;

C.I. Acid Brown:
2, 4, 13, 14, 19, 28, 44, 123, 224, 226, 227, 248, 282, 283, 289, 294, 297, 298, 301, 355, 357, 413;

C.I. Acid Black:
1, 2, 3, 24, 26, 31, 50, 52, 58, 60, 63, 107, 109, 112, 119, 132, 140, 155, 172, 187, 188, 194, 207, 222;

C.I. Direct Yellow:
8, 9, 10, 11, 12, 22, 27, 28, 39, 44, 50, 58, 79, 86, 87, 98, 105, 106, 130, 132, 137, 142, 147, 153;

C.I. Direct Orange:
6, 26, 27, 34, 39, 40, 46, 102, 105, 107, 118;

C.I. Direct Red:
2, 4, 9, 23, 24, 31, 54, 62, 69, 79, 80, 81, 83, 84, 89, 95, 212, 224, 225, 226, 227, 239, 242, 243, 254;

C.I. Direct Violet:
9, 35, 51, 66, 94, 95;

C.I. Direct Blue:
1, 15, 71, 76, 77, 78, 80, 86, 87, 90, 98, 106, 108, 160, 168, 189, 192, 193, 199, 200, 201, 202, 203, 218, 225, 229, 237, 244, 248, 251, 270, 273, 274, 290, 291;

C.I. Direct Green:
26, 28, 59, 80, 85;

C.I. Direct Brown:
44, 106, 115, 195, 209, 210, 222, 223;

C.I. Direct Black:
17, 19, 22, 32, 51, 62, 108, 112, 113, 117, 118, 132, 146, 154, 159, 169;

C.I. Reactive Yellow:
2, 3, 7, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175, 176;

C.I. Reactive Orange:
1, 4, 5, 7, 11, 12, 13, 15, 16, 20, 30, 35, 56, 64, 67, 69, 70, 72, 74, 82, 84, 86, 87, 91, 92, 93, 95, 107;

C.I. Reactive Red:
2, 3, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 228, 235;

C.I. Reactive Violet:
1, 2, 4, 5, 6, 22, 23, 33, 36, 38;

C.I. Reactive Blue:
2, 3, 4, 5, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, 236;

C.I. Reactive Green:
8, 12, 15, 19, 21;

C.I. Reactive Brown:
2, 7, 9, 10, 11, 17, 18, 19, 21, 23, 31, 37, 43, 46;

C.I. Reactive Black:
5, 8, 13, 14, 31, 34, 39;

C.I. Hood Black:
1 and 2.

Commonly known organic and inorganic pigments can be employed as a pigment usable in the invention, and anionic pigments are preferred. Examples thereof include organic pigments, such as azo pigments, e.g., azo lake, insoluble azo pigments, condensed azo pigments and chelate azo pigments; polycyclic pigments such as phthalocyanine pigments, perylene and perylene pigments, anthraquinone pigments, quinacridone pigments, dioxanedine pigments, thioindigo pigments, isoindolinone pigments, and quinophthaloni pigment; dye lakes such as an acid dye type lake; organic pigments such a nitro pigment, nitroso pigment, aniline black and a daylight fluorescent pigment; and inorganic pigments such as carbon black.

Specific examples of organic pigments are as follows.

Examples of magenta or red pigments include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178 and C.I. Pigment Red 122.

Examples of orange or yellow pigments include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128 and C.I. Pigment Yellow 138.

Examples of green or cyan pigments include C.I. Pigment Blue 15, C.I. Pigment Blue 15:2, C.I. Pigment Blue 15:3, C.I. Pigment Blue 16, C.I. Pigment Blue 60, and C.I. Pigment Green 7.

To stably disperse pigments described above in the ink, water-soluble resins, as described below are preferably employed as a water-soluble polymer dispersant in terms of ejection stability. Examples of a preferred water-soluble resin include styrene/acrylic acid/alkyl acrylate copolymer, styrene/acrylic acid copolymer, styrene/maleic acid copolymer, styrene/maleic acid/alkyl acrylate copolymer, styrene/methacrylic acid copolymer, styrene/methacrylic acid/alkyl acrylate copolymer, styrene/maleic acid half ester copolymer, vinylnaphthalene/acrylic acid copolymer, and vinylnaphthalene/maleic acid copolymer.

The water-soluble resin content is preferably from 0.1% to 10% by weight of the total amount of an ink, and more preferably 0.3% to 5%.

Water-soluble resins may be used alone or in combination.

Anionic pigments are usable in the invention. In terms of dispersion stability, a pigment, as described above which is dispersed with an anionic polymer dispersant or an anion-modified self-dispersing pigment is preferred as a form of an anionic pigment used in the invention. The anionic polymer dispersant refers to a dispersing agent containing an anionic group which is obtained by neutralizing an acidic group included in the molecule with a basic compound. Examples of such a basic compound include an alkali metal hydroxide such as sodium hydroxide or potassium hydroxide, ammonia and amines such as an alkylamine, and alkanolamine. Amines are specifically preferred in the invention.

Any anionic polymer dispersant having a molecular weight of 1,000 or more is preferably used in the invention. Examples thereof include polyvinyl alcohols; polyvinyl pyrrolidones; acryl resin such as polyacrylic acid, acrylic acid/acryl nitrile copolymer, potassium acrylate/acryl nitrile copolymer, vinyl acetate/acrylic acid ester copolymer and acrylic acid/acrylic acid ester copolymer; styrene-acryl resin styrene-acrylic acid copolymer, styrene/methacrylic acid copolymer, styrene/methacrylic acid/acrylic acid ester copolymer, styrene/α-methylstyrene/acrylic acid copolymer and styrene/α-methylstyrene/acrylic acid/acrylic acid ester copolymer; styrene/maleic acid copolymer, styrene/maleic acid anhydride copolymer; vinylnaphthalene/acrylic acid copolymer, vinylnaphthalene/maleic acid copolymer; vinyl acetate type copolymer and its salt, such as vinyl acetate/ethylene copolymer, vinyl acetate/vinyl carboxylate ethylene copolymer, vinyl acetate/maleic acid ester copolymer, vinyl acetate/crotonic acid copolymer and vinyl acetate/acrylic acid copolymer; and resins containing a homopolymer, copolymer or terpolymer having an acidic functionality of carboxylic acid, sulfonic acid or phosphonic acid. Examples of a monomer providing such an acidic functionality include acrylic acid, methacrylic acid, crotonic acid, maleic acid, maleic acid anhydride, itaconic acid, mesaconic acid, fumaric acid, citraconic acid, vinylacetic acid, acryloxypropionic acid, vinylsulfonic acid, styrenesulfonic acid, 2-acrylamide-2-methylpropanesulfonic acid, allylsulfonic acid, allylphosphonic acid, vinylphosphonic acid and vinylsulfonic acid.

The anion-modified self-dispersing pigment used in the invention, refers to a particulate pigment with an anionic group on the particulate surface and dispersible without a dispersing agent. Thus, the anion-modified self-dispersing pigment is a pigment which is modified by neutralizing an acidic group-modified pigment with a basic compound, rendering the acidic group to be anionic, whereby the anionic self-dispersing pigment is dispersible in water without using a surfactant.

The particulate pigment with an anionic group on the particulate surface refers to pigment particles, the surface of which is directly modified with an acidic group or to an organic compound containing an organic pigment nucleus, to which an acidic group is bonded directly or via a joint.

Examples of an acidic group (also referred to as a polar group) include a sulfonic acid group, a carboxylic acid group, a phosphoric acid group, a boric acid group and a hydroxyl group. Of these groups, a sulfonic acid group and carboxylic acid group are preferred and a sulfonic acid group is more preferred.

Modifying agents for an acidic group include, for example, sulfur atom-containing treatment agents such as sulfuric acid, fuming sulfuric acid, sulfur trioxide, chlorosulfuric acid, fluorosulfuric acid, amidosulfuric acid, sulfonated pyridine salt and sulfamic acid, and calboxylating agents which oxidizes the pigment particle surface to introduce a carboxylic acid group, such as sodium hypochlorite and potassium hypochlorite. Of these, sulfonating agents such as sulfur trioxide, a sulfonated pyridine salt or sulfamic acid and a carboxylating agent are preferred. As a basic compound to neutralize an acidic group are cited an alkali metal hydroxide such as sodium hydroxide or potassium hydroxide, ammonia and amines such as an alkylamine or alkanolamine. Amines are specifically preferred in the invention.

The particulate pigment with a polar group on the particulate surface (i.e., pigment particles having a polar group on the surface of the particles) can be obtained by oxidizing the surface of the pigment particles with an appropriate oxidizing agent to introduce a polar group such as a sulfonic acid group or its salt to at least a part of the particle surface, as described in WO97/48769, JP-A Nos. 10-110129, 11-246807, 11-57458, 11-189739, 11-323232 and 2000-265094. More specifically, carbon black is oxidized by concentrated nitric acid or color pigments are oxidized with sulfamic acid, sulfonated pyridine salt or amidosulfuric acid in sulfolane or N-methyl-2-pyrrolidone. Oxidation proceeds through such a reaction and water-soluble materials are removed by purification, whereby a pigment dispersion is obtained. A sulfonic acid group which was introduced through oxidation onto the particle surface, may optionally be neutralized with a basic compound.

There are further cited a method in which pigment derivatives are allowed to adsorb onto the pigment particle surface through a milling treatment or the like, as described in JP-A Nos. 11-49974, 2000-273383 and 2000-303014, and a method in which a pigment is dissolved together with a pigment derivative in a solvent and allowed to precipitate in a poor solvent, as described in Japanese Patent Application No. 2000-377068, 2001-1495 and 2001-234966.

The polar group may be in the form of being free or a salt, or may combine with a counter ion to form a counter salt. Examples of such a counter ion include inorganic ions (e.g., lithium, sodium, potassium, magnesium, calcium, aluminum, nickel, ammonium) and organic ions (e.g., trimethylammonium, diethylammonium, pyridinium, triethanolammonium), of which monovalent counter ions are preferred.

A pigment dispersion usable for the ink-jet ink of the invention is preferably composed of pigment particles exhibiting an average particle size of not more than 500 nm, more preferably not more than 200 nm, still more preferably not less than 10 nm and not more than 200 nm, and further still more preferably not less than 10 nm and not more than 150 nm. An average pigment particle size of more than 500 nm results in an instable dispersion. An average pigment particle size of less than 10 nm results in poor stability of a pigment dispersion, leading to deteriorated storage stability of the ink.

The particle size of a particulate pigment dispersion can be measured by commercially available particle size measuring instruments employing light scattering, electrophoresis or laser Doppler effect. Alternatively, a transmission electron micrograph of at least 100 particles is subjected to a statistical treatment using an image analysis software such as Image-Pro (produced by Media Cybernetics) to determine the particle size.

Pigments can be dispersed by using a ball mill, a sand mill, atriter, a roll mill, an agitator, a Henschel mixer, a colloid mill, a ultrasonic homogenizer, a pearl mill, wet jet mill or a paint shaker.

In the ink-jet ink of the invention, the content of a water-dispersible or water-soluble pigment is preferably from 1% to 10% by weight of the total amount of the ink.

An aqueous liquid medium is preferably used as a solvent usable in the invention. Such an aqueous liquid medium (or aqueous solvent) is preferably a mixture of water and water-soluble organic solvents. Examples of a preferable water-soluble organic solvent include alcohols (e.g., methanol, ethanol, propanol, isopropanol, butanol, isobutanol, secondary butanol, tertiary butanol), polyhydric alcohols (e.g., ethylene glycol, diethylene glycol, triethylene glycol, polyethylene glycol, propylene glycol, dipropylene glycol, polypropylene glycol, butylenes glycol, hexane-diol, pentane-diol, glycerin, hexane-triol, thiodiglycol), polyhydric alcohol ethers (e.g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, ethylene glycol monophenyl ether, propylene glycol monophenyl ether), amines )e.g., ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, tetramethylpropylenediamine), amides (e.g., formamide, N,N-dimethylformamide, N,N-dimethylacetoamide), heterocycles (e.g., 2-pyrrolidone, N-methyl-2-pyrrolidone, cyclohexylpyrrolidone, 2-oxazolidone, 1,3-dimethyl-2-imidazolidinone) and sulfoxides (e.g., dimethylsulfoxide).

Surfactants usable in the ink relating to the invention include, for example, nonionic surfactants such as polyoxyethylene alkyl ethers, polyoxyalkylene alkylphenylethers, acetylene glycols, and polyoxyethylene/polyoxypropylene block copolymers; glycerin esters, sorbitan esters, polyoxyethylene carboxylic acid amides and amine oxides. These surfactants are also usable as a dispersing agent of pigments.

An electrically charged surfactant acts onto a polymerization initiator or a polymeric compound capable of curing via side chains, not only lowering reaction efficiency but also deteriorating ink storage stability. Such problems are remarkable in the constitution using the polymeric compound of the invention.

On the contrary, the use of nonionic surfactants at a specific amount results in enhanced reaction efficiency and improved storage stability. Such effects are marked in the use of polymeric compounds used in the invention. The surfactant content is preferably from 0.1% to 3%, and more preferably 0.4% to 1.5% by weight of the ink.

Commonly known additives may also be incorporated. Examples thereof include a brightener, a defoaming agent, a lubricant, an antiseptic agent, a thickening agent, an antistatic agent, a matting agent, a water-soluble polyvalent metal salt, an acid or base, a pH buffering agent, an antioxidant, a surface tension-controlling agent, a specific resistance-controlling agent, an anti-rusting agent and an inorganic pigment.

Recording mediums usable in the invention are not specifically limited and any one capable of being printed is usable. Not only conventional coated or non-coated paper but also non-absorptive plastics and their film are usable in the invention.

Paper includes coated paper and non-coated paper. Coated paper includes art paper in which the coated amount on one side is approximately 20 g/m$^2$, coated paper in which the coated amount on one side is approximately 10 g/m$^2$, light weight coated paper in which the coated amount on one side is approximately 5 g/m$^2$, ultra-light weight coated paper, matte finished coated paper, dull-coated paper of dull finished, and newsprint paper. Non-coated paper includes printing paper A employing 100% chemical pulp, printing paper B employing at least 70% chemical pulp, printing paper C employing from 40-70% chemical pulp, printing paper D employing at most 40% chemical pulp, and gravure paper which incorporates mechanical pulp and has been subjected to calendering. More details on paper are described in "Saishin Kamikako Binran (Handbbok of Recent Paper Treatments)", edited by Kako Binran Henshuiinkai, published by Tech. Times and "Insatsu Kogaku Binran (Printing Engineering Handbook)", edited by Nihon Insatsu Gakkai (The Japanese Society of Printing Science and Technology).

As plain paper are used 80 to 200 μm thick non-coated types of paper which are considered as non-coated paper, special printing paper, and information paper. Examples of plain paper usable in the invention include high quality printing paper, medium quality printing paper, and low quality printing paper, thin printing paper, ultra-light weight coated printing paper, or special printing paper such as high quality colored paper, form paper sheets, PPC sheets, and other kinds such as information sheets. Specifically, there is available is paper described below and various modified/treated papers, but the present invention is not limited thereto.

There are cited HIGH QUALITY PAPER, HIGH QUALITY COLORED PAPER, RECYCLED PAPER, COPYING PAPER/COLOR, OCR PAPER, NON-CARBON PAPER/COLOR, SYNTHETIC PAPER such as YUPO 60, 80, and 110 MICRON, or YUPOCOAT 70 and 90 MICRON, others such as ONE SIDE ART PAPER 68 kg, COATED PAPER 90 kg, MATTE FORM PAPER 70, 90, and 110 kg, FOAMED PET 38 micron, and MITSUORIKUN (all available from Kobayashi Kirokushi Co., Ltd.), OK HIGH QUALITY PAPER, NEW OK HIGH QUALITY PAPER, SUN FLOWER, PHOENIX, OK ROYAL WHITE, HIGH QUALITY EXPORT PAPER (NPP, NCP, NWP, and ROYAL WHITE), OK BOOK PAPER, OK CREAM BOOK PAPER, CREAM HIGH QUALITY PAPER, OK MAP PAPER, OK ISHIKARI, KYUUREI, OK FORM, OKH, and NIP-N (all available from NEW OJI PAPER); KINO, TOKO, EXPORT HIGH QUALITY PAPER, SPECIAL DEMAND HIGH QUALITY PAPER, BOOK PAPER, BOOK PAPER L, PALE CREAM BOOK PAPER, PRIMARY SCHOOL SCIENCE TEXT BOOK PAPER, CONTINUOUS SLIP PAPER, HIGH QUALITY NIP PAPER, GINKAN, KINYO, KINYO (W), BRIDGE, CAPITAL, GINKAN BOOK PAPER, HARP, HARP CREAM, SK COLOR, SECURITY PAPER, OPERA CREAM, OPERA, KYP CARTE, SYLVIA HN, EXCELLENT FORM, and NPI FORM DX (all available from Nippon Paper Co., Ltd.); PEARL, KINRYO, PALE CREAM HIGH QUALITY PAPER, SPECIAL BOOK PAPER, SUPER BOOK PAPER, DIAFORM, and INK-JET FORM (all available from Mitsubishi Paper Mills, Ltd.); KINMO V, KINMO SW, HAKUZO, HIGH QUALITY PUBLISHING PAPER, CREAM KINMO, CREAM HAKUZO, SECURITY/TRADABLE COUPON PAPER, BOOK PAPER, MAP PAPER, COPY PAPER, and HNF (all available from Hokuetsu Paper Mills, Ltd.); SIORAI, TELEPHONE DIRECTORY COVER, BOOK PAPER, CREAM SHIORAI, CREAM SHIORAI MEDIUM ROUGH, CREAM SHIORAI HIGH ROUGH, and DSK (all available from Daishowa Paper Manufacturing Co., Ltd.); SENDAI MP HIGH QUALITY PAPER, KINKO, RAICHO HIGH QUALITY, HANGING PAPER, COLORED PAPER BASE PAPER, DICTIONARY PAPER, CREAM BOOK, WHITE BOOK, CREAM HIGH QUALITY PAPER, MAP PAPER, and CONTINUOUS SLIP PAPER (Chuetsu Paper & Pulp Co., Ltd.); OP KINO (CHUETSU), KINSA, REFERENCE PAPER, TRADABLE COUPON PAPER (WHITE)), FORM PRINTING PAPER, KRF, WHITE FORM, COLOR FORM, (K)NIP, FINE PPC, and KISHU INK-JET PAPER (all produced by Kishu Paper Co., Ltd.); TAIOU, BRIGHT FORM, KANT, KANT WHITE, DANTE, CM PAPER, DANTE COMIC, HEINE, PAPER BACKS PAPER, HEINE S, NEW AD PAPER, UTRILLO EXCEL, EXCEL SUPER A, KANTO EXCEL, EXCEL SUPER B, DANTE EXCEL, HEINE EXCEL, EXCEL SUPER C, EXCEL SUPER D, AD EXCEL, EXCEL SUPER E, NEW BRIGHT FORM, and NEW BRIGHT NIP (all available from Daio Paper Corporation); NICHIRIN, GETSURIN, UNREI, GINGA, HAKUUN, WAISU, GETURIN ACE, HAKUUN ACE, and UNKIN ACE (all produced by Japan Paper Industry Co., Ltd.); TAIOU, BRIGHT FORM and BRIGHT NIP (all available from Nagoya Pulp Co., Ltd.); BOTAN A, KINBATO, TOKU BOTAN, SHIROBOTAN A, SHIROBOTAN C, GINBATO, SUPER SHIROBOTAN A, PALE CREAM SHIROBOTAN, SPECIAL MEDIUM QUALITY PAPER, SHIROBATO, SUPER MEDIUM QUALITY PAPER, AO BATO, AKA BATO, KIN BATO M SNOW VISION, KIN BATO SNOW VISION, SHIRO BATO M, SUPER DX, HANAMASU O, AKA BATO M, and HK SUPER PRINTING PAPER (all manufactured by Honshu Paper Co., Ltd.); STAR LINDEN (A-AW), STAR ELM, STAR MAPLE, STAR LAUREL; STAR POPLAR, MOP, STAR CHERRY I, CHERRY I SUPER, CHERRY II SUPER, STAR CHERRY III, STAR CHERRY IV, CHERRY III SUPER, and CHERRY IV SUPER (all produced by Marusumi Paper Co., Ltd.); SHF (produced by Toyo Pulp Co., Ltd.); and TRP (produced by Tokai Pulp Co., Ltd.).

Various kinds of films are usable in the invention. Examples thereof include polyethylene terephthalate, polyester, polyolefin, polyamide, polyester amide, polyether, polyimide, polyamidoimide, polystyrene, polycarbonate, poly-p-phenylene sulfide, polyether ester, polyvinyl chloride, poly(meth)acrylic acid ester, polyethylene, polypropylene and nylon. Copolymers of the foregoing resins, a mixture of the foregoing resins or crosslinked resins are also usable. Specifically, of resins as a resin film are chosen stretched polyethylene terephthalate, polystyrene, polypropylene and nylon. These resin films are preferable in terms of transparency, dimension stability, rigidity, environmental protection and cost. A 2-100 µm (preferably 6-50 µm) thick resin film is also preferred. Such a resin film may be subjected to a surface treatment, e.g., a corona discharge treatment or adhesion-promoting treatment. Opaque film such as resin-coated paper, pigment-containing film and foamed film is also applicable. There are also usable resin-coated paper used for photographic print paper and YUPO paper of synthetic paper.

The recording medium usable in the invention preferably exhibits a water absorption amount of 0.5 to 5 ml/m$^2$ at a contact time (or absorption time) of 0.5 sec. Such recording mediums include for example, coated paper and synthetic paper. The water absorption amount, which represents a parameter of water absorbability of the recording medium, is determined in accordance with the Bristow's method, as defined in J. TAPPI Paper and Pulp Test method No. 51-87. This method specifies a method for measuring liquid absorbing behavior of paper and board in a short period of time. The relating reference is described in Tappi J, 65 (12) 98 (1982). The measurement is conducted in the manner, as described, for example, in U.S. Pat. No. 6,620,470.

The embodiments of the invention are described with reference to FIG. 1.

Figure 1:
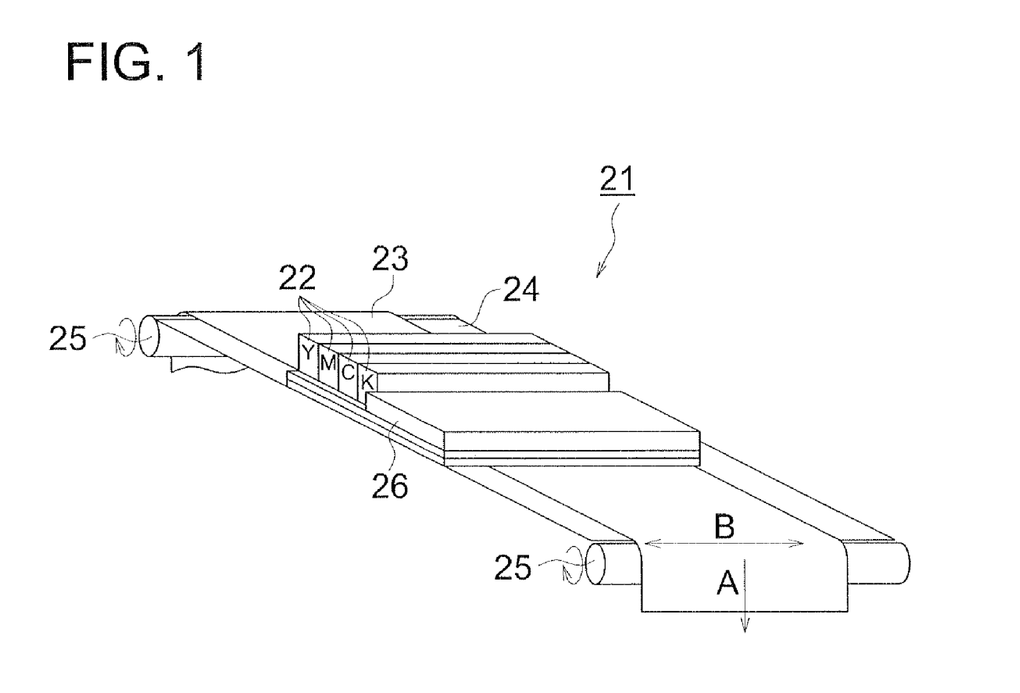
FIG. 1 illustrates an example of an ink-jet recording apparatus.

FIG. 1 illustrates a perspective view of ink-jet recording apparatus 21 used in Embodiment 1 of the invention, as one of the embodiments of the invention.

The ink-jet recording apparatus 21 us a line system ink-jet recording apparatus, in which recording heads 22 (Y, M, C and K) are disposed and each extending in the main scanning direction B, that is, in the direction vertical to the conveyance direction (or sub-scanning direction A) of a recording medium 23, and image recording is performed by using photo-curable inks, while conveying the recording medium 23.

As shown in FIG. 1, the ink-jet recording apparatus 21 is provided with a platen 24 which supports the recording medium 23 from the side of the non-recording surface. Recording medium conveyance mechanisms 25 to convey the recording medium 23 are provided on both ends in the sub-scanning direction A of the platen 24. Above the platen 24 of the side of the recording medium 24, four recording heads 22 (designated as Y, M, C and K), each of which extends in the main scanning direction (that is the direction vertical to the conveyance direction of the recording medium), are disposed along the sub-scanning direction (that is the conveyance direction of the recording medium).

In each of the recording heads 22 (Y, M, C and K), plural nozzles to eject a photo-curable ink of either one of yellow (Y), magenta (M), cyan (C) and black (K) onto the recording medium 23 are linearly arranged on the surface facing to the recording medium 23. Thus, the nozzles eject the ink in the form of droplets and the ejected ink droplets are deposited onto the recording medium 23 to form ink dots on the recording medium 23.

Further, a light exposure device 26 to cure the ink deposited on the recording medium 23 is provided near the recording heads 22 (Y, M, C and K), at the downstream end side in the conveyance direction of the recording medium 23. In the light exposure device 26, a bar light source for irradiating light is disposed parallel to the arrangement direction of the nozzles.

Next, a control section of the ink-jet recording apparatus 21 will be described. The ink-jet recording apparatus 21 is provided with an input section to transmit image recording data to a control section.

When the control section receives image recording data, the control section regulates the timing of ink ejection from the recording heads 22 (Y, M, C and K) and the conveyance rate of the recording medium 23 in the sub-scanning direction and is connected to a recording section containing a processing program to make the number of ink dots per unit length in the sub-scanning direction A greater than the number of ink dots per unit length in the main scanning direction B. The control section is further connected to the recording heads 22 (Y, M, C, K), to the light exposure device 26 to expose the ink deposited on the recording medium 23 to light and to the recording medium conveyance mechanisms 25. The control section controls various equipments contained in the memory section in accordance with various programs contained in the memory section, based on the image recording data.

The action of the ink-jet recording apparatus 21 of Embodiment 1 will be described below. When image recording data are transmitted to the control section from the input section, the control section controls, based on the image recording data, the recording heads 22 (Y, M, C, K), the light exposure device 26 and the recording medium conveyance mechanism 25 to start image recording.

Specifically, while operating the ink-jet recording apparatus 21, the control section regulates the timing of ink ejection from the recording heads 22 (Y, N, C and K) to ejects respective inks and concurrently conveys the recording medium 23 at a conveying amount corresponding to the ink ejection timing. Thus, in the embodiments of the invention, the control section controls at least one of the timing of ink ejection and conveyance of the recording medium 23 so that the number of ink dots per unit length in sub-scanning direction A is more than that in the main scanning direction A on the recording medium 23. Specifically, in the Embodiment 1, the control section conducts controlling the timing of ink ejection concurrently with regulating the conveyance rate of the recording medium 23 so that the number of ink dots per unit length in sub-scanning direction A is more than that in the main scanning direction A on the recording medium 23. The conveyance rate of the recording medium is preferably within the range of from 21 cm/min to 40 m/min. The number of ink dots per unit length, which is expressed in terms of dots per inch (2.54 cm) or "dpi", also represents resolution of an image. The number of ink dots per unit length is preferably not less than 600 dpi respectively in the main scanning direction and in the sub-scanning direction.

Subsequently, the control section allows the light exposure device 26 to irradiate light toward ink dots deposited onto the recording medium 23. Thereby, ink ejected from each of the recording heads 22 (y, M, C, K) is cured upon exposure to light immediately after deposited onto the recording medium 23 and fixed onto the recording surface of the recording medium 23. The amount of an ink ejected from the recording head is preferably within the range of from 1 to 14 pl/dot, that is, ink droplets ejected from the recording heads preferably have a volume of 1 to 14 pico-liter per droplet.

Thus, when the ink-jet recording apparatus 21 conducts image recording in the foregoing Embodiment 1, even if the number of nozzles per unit length of the recording head 22 (Y, M, C, K) is not increased or the timing of ink ejection is not quickened, the control section regulates the timing of ink ejection by the recording heads (Y, M, C, K) and controls the conveyance rate of the recording medium 23 in the sub-scanning direction A by the recording medium conveyance mechanism 25 so that the number of dots per unit length in the sub-scanning direction A is more than that in the main scanning direction B, thereby achieving a precise image which results in natural glossiness of both the image and the white background.

Further, plural combinations of ink-jet heads and a light exposure device may appropriately be combined or the recording medium may be passed plural times under the recording heads and the light exposure device. In Embodiment 2, for instance, two combinations of different color heads and a single light source are used, and achieving an intended image resolution.

EXAMPLES

The present invention will be further described with reference to examples but is by no means limited to these examples. In examples, "%" designates percent by weight (or wt %), unless otherwise noted.

Synthesis of Polymer Compound

Polymer Compound 1:

Into a reaction vessel were placed 56 g of glycidyl methacrylate, 48 g of p-hydroxybenzaldehyde, 2 g of pyridine and 1 g of N-nitroso-phenylhydroxylamine ammonium salt and reacted with stirring in a water bath at 80° C. for 8 hrs to obtain p-(3-methacryloxy-2-hydroxypropyloxy)benzaldehyde.

Next, 40 g of saponified polyvinyl acetate exhibiting a polymerization degree of 300 and a saponification degree of 88%, and 5 g of saponified polyvinyl acetate exhibiting a polymerization degree of 500 and a saponification degree of 99% were dispersed in 230 g of deionized water to obtain a solution. Then, to this solution, 5 g of phosphoric acid and p-(3-methacryloxy-2-hydroxypropyloxy)benzaldehyde obtained in the foregoing reaction was further added in such an amount that the modification ratio of the side chains to the backbone (PVA) was 3.2 mol % and stirred at 90° C. for 6 hrs. The obtained solution was cooled to room temperature and 30 g of a basic ion-exchange resin was added thereto and stirred for 1 hr. Thereafter, the ion-exchange resin was filtered out and IRGACURE 2959 (produced by Ciba Speciality Chemicals Corp.), as a photopolymerization initiator was added at a ratio of 1.2 g per 100 g of an aqueous 15% solution Then, the solution was diluted with deionized water to obtain an aqueous 10% polymer compound solution 1.

Preparation of Ink-jet Ink

Yellow (Y) Pigment Dispersion:

Yellow pigment self-dispersion cabo-jet 250, produced by Cabot Co. was diluted with deionized water to prepare a yellow pigment dispersion having a yellow pigment content of 10%. The average particle size of yellow pigment particles contained in the yellow pigment dispersion was 220 nm. The particle size was determined by using Zetasizer 1000HS (produced by Malvern Corp.).

Magenta (M) Pigment Dispersion:

Magenta pigment self-dispersion cabo-jet 260, produced by Cabot Co. was diluted with deionized water to prepare a magenta pigment dispersion having a magenta pigment content of 10%. The average particle size of magenta pigment particles contained in the magenta pigment dispersion was 181 nm. The particle size was determined by using Zetasizer 1000HS (produced by Malvern Corp.).

Cyan (C) Pigment Dispersion:

Cyan pigment self-dispersion cabo-jet 270, produced by Cabot Co. was diluted with deionized water to prepare a cyan pigment dispersion having a cyan pigment content of 10%. The average particle size of cyan pigment particles contained in the cyan pigment dispersion was 153 nm. The particle size was determined by using Zetasizer 1000HS (produced by Malvern Corp.).

Black Pigment Dispersion:

Carbon black self-dispersion cabo-jet 300, produced by Cabot Co. was diluted with deionized water to prepare a black pigment dispersion having a carbon black content of 10%. The average particle size of carbon black particles contained in the thus obtained black pigment dispersion was 111 nm. The particle size was determined by using Zetasizer 1000HS (produced by Malvern Corp.).

Preparation of Ink Set 1

Using each of the foregoing pigment dispersions, yellow, magenta, cyan and black inks were each prepared according to the following formula:

| | |
|---|---|
| Pigment dispersion | 30 parts |
| Polymer compound 1 | 28 parts |
| 2-Pyrrolidone | 12 parts |
| Ethylene glycol | 20 parts |
| Diethylene glycol monobutyl ether | 2 parts |
| Olfin E 1010 (produced by Nishin Kagaku Co., Ltd.) | 0.6 parts |
| Water to make 100 parts | |

The respective ink sets were combined with either one of three different sheets of Synthetic paper YUPO (Yupo Corp.), Coated paper for use in printing, POD Gloss Coat (produced by SHIN OJI PAPER) and Coated paper for use in printing, SA Kinfuji (produced by SHIN OJI PAPER), as a recording medium and evaluated as described below. Water absorption of the respective recording mediums was evaluated. Specifically, the absorption amount of water at a contact time of 0.5 sec. was determined according to the Bristow's method defined in J. TAPPI Paper and Pulp Test Method No. 51-87, employing a Bristow Test Machine Type II (compression type), manufactured by Kumagai Riki Kogyo Co., Ltd.

Evaluation

In the afore-described Embodiment 1 or 2, using the ink set, ink-jet recording was conducted on a recording medium shown in Table 1, in which ejecting conditions, the timing of ink ejection and the conveyance rate of the ink-et recording apparatus were so controlled that an image resolution (which is represented by the number of dots per inch or dpi) was achieved, as shown in Table 1.

Color Bleeding Resistance:

A magenta solid image was printed on the respective recording mediums to form a solid magenta background. Further, fine black lines with a 100 μm width were printed on the magenta solid background and visually evaluated.

The respective inks were continuously ejected and exposed to a 120 W/cm metal halide lamp (MAL 400NL, produced by Nippon Denchi Co., at a source power of 3 kW·hr) 0.1 sec. after deposition.

Evaluation was made with respect to resistance to color bleeding of the line images, based on the following criteria:

A: the boundary between fine lines and the solid background was distinct,

B: slight bleeding was observed at boundary areas but presented no problem in quality, C: bleeding was observed at the boundary areas but was acceptable in quality for practical use, D: bleeding was apparent at the boundary areas and the line width was increased ca. 1.5 times, causing quality concerns in practical use, E: the boundary between the fine lines and the solid background was unclear and resistance to bleeding was obviously poor.

In the above, evaluations "D" and "E" were at an unacceptable level as a product.

Glossiness of Solid Image:

A black solid image of 10 cm×10 cm was printed similarly on the respective recording mediums and visually evaluated with respect to glossiness of the solid image area on a white background, based on the following criteria:

A: glossiness of the image area was uniform,

B: slightly non-uniform glossiness of the image area was partially observed but was at an acceptable level, C: slightly non-uniform glossiness was observed in the overall image area but was at an acceptable level, D: non-uniform glossiness was apparent to the naked eye over the entire image area and was at an unacceptable level, E: completely non-uniform glossiness of the image area was apparent, due to rising of deposited ink dots and was at an unacceptable level.

In the above, evaluations "D" and "E" were at an unacceptable level as a product.

Glossiness of Line Image on White Background:

Ten black lines of 5 mm×10 cm were printed at intervals of 5 mm on the respective recording mediums and visually evaluated with respect to glossiness of the line images on a white background, based on the following criteria:

A: no difference in glossiness between the lines and the background was observed as natural, B: a slight difference in glossiness between the lines and the background was observed but it was at an acceptable level, C: a slight difference in glossiness between the lines and the background was observed, and glossiness of the lines was greater than that of the background, D: a difference in glossiness between the lines and the background was apparent and glossiness of the images was greater than that of the background, E: a difference in glossiness between the lines and the background was obvious and glossiness of the images was markedly greater than that of the background.

In the above, grades "D" and "E" were at an unacceptable level as a product.

Image Density:

Using the respective color inks, solid images were overprinted on art paper (NK Art KANEFUJI N, produced by NEW OJI PAPER.), and the respective color densities were measured using a reflection densitometer (X-rite, produced by X-Rite Co.), and evaluated based on the following criteria:

A: an average density of four colors being not less than 1.5,

B: a black density of less than 1.5 and not less than 1.2,

C: a black density of less than 1.2 and not less than 1.0,

D: a black density of less than 1.0 and not less than 0.8,

E: a black density of less than 0.8.

Results are shown in Table 1.

TABLE 1

| Example No. | Embodiment No. | Resolution (dpi) Main Scanning | Resolution (dpi) Sub-scanning | Recording Medium (ml/m²)* | Conveyance Rate (cm/min) | Ink Dot Volume (pl/dot) | Color Bleeding Resistance | Glossiness Solid Image | Glossiness Line Image | Density | Remarks |
|---|---|---|---|---|---|---|---|---|---|---|---|
| 1 | 1 | 720 | 1440 | *1(0.02) | 22 | 4 | B | B | B | B | Inv. |
| 2 | 1 | 360 | 720 | *1(0.02) | 31 | 38 | C | B | C | B | Inv. |
| 3 | 1 | 720 | 360 | *2(4.8) | 22 | 4 | D | D | B | D | Comp. |
| 4 | 1 | 720 | 800 | *2(4.8) | 24 | 4 | B | B | B | B | Inv. |
| 6 | 1 | 720 | 1080 | *3(0.6) | 19 | 7 | B | B | B | B | Inv. |
| 7 | 2 | 720 | 1080 | *1(0.02) | 33 | 7 | A | B | B | A | Inv. |
| 8 | 2 | 720 | 1440 | *1(0.02) | 32 | 12 | B | A | B | A | Inv. |
| 9 | 2 | 720 | 360 | *2(4.8) | 28 | 4 | C | B | D | D | Comp. |
| 10 | 2 | 720 | 1440 | *2(4.8) | 19 | 4 | A | A | A | A | Inv. |
| 11 | 2 | 720 | 1080 | *2(4.8) | 30 | 4 | A | A | A | A | Inv. |
| 12 | 2 | 360 | 720 | *2(4.8) | 24 | 38 | C | C | B | B | Inv. |
| 13 | 2 | 360 | 1080 | *3(0.6) | 28 | 38 | B | B | B | B | Inv. |
| 14 | 2 | 720 | 1440 | *3(0.6) | 29 | 4 | A | A | A | A | Inv. |
| 15 | 2 | 720 | 600 | *3(0.6) | 24 | 38 | E | C | D | B | Comp. |

*: Water absorption amount at 0.5 sec., measured in Bristol method defined in J. TAPPI paper and pulp test method No. 51-87
*1: Synthetic paper YUPO (Yupo Corp.)
*2: Coated paper for use in printing, POD Gloss Coat (produced by SHIN OJI PAPER)
*3: Coated paper for use in printing, SA Kinfuji (produced by SHIN OJI PAPER)

As can be seen from Table 1, it was proved that examples of the invention were superior in the foregoing evaluations to the comparative examples. Specifically, there was provided an ink-jet recording method which enabled recording of precise images by using a photo-curable ink even onto a recording medium exhibiting poor ink absorptivity, without increasing the number of nozzles of a recording head or without greatly quickening the timing of ejection of the recording head.

What is claimed is

1. An ink-jet recording method comprising the steps of:
ejecting an ink from a recording head of an ink-jet recording apparatus to form ink dots on a recording medium so that the number of ink dots per unit length is greater in the sub-scanning direction than in the main scanning direction, and exposing the recording medium to an actinic ray, wherein the ink comprises a colorant, water and a polymeric compound which is comprised of a hydrophilic backbone having plural side chains and is capable of curing via the side chains upon exposure to the actinic ray; and the ink-jet recording apparatus is provided with at least one recording head having plural nozzles which eject the ink and are arranged in a main scanning direction, a light source to expose the recording medium to the actinic ray and a recording medium conveyance mechanism to convey the recording medium in a sub-scanning direction; and wherein the recording medium exhibits an absorption amount of water of 0.5 to 5 ml/m$^2$ at a contact time of 0.5 sec. in a Bristow method defined in J. TAPPI paper and pulp test method No. 51-87.

2. The method of claim 1, wherein the recording medium is a coated paper or a synthetic paper.

3. The method of claim 1, wherein the rate of conveying the recording medium in the sub-scanning direction is from 21 cm/min to 40 m/min.

4. The method of claim 1, wherein the ink is ejected from the recoding head at an amount of 1 to 14 pl per dot.

5. The method of claim 1, wherein the number of ink dots per unit length is not less than 600 dpi and not more than 1440 dpi in the sub-scanning direction and in the main scanning direction.

6. The method of claim 1, wherein in the polymeric compound, the backbone is a saponified polyvinyl acetate exhibiting a saponification degree of 77% to 99%, a polymerization degree of 300 to 4000 and a modification ratio of the side chains to the backbone of not less than 0.5 mol % and not more than 4 mol %.

7. The method of claim 1, wherein the ink contains a water-soluble organic solvent in an amount of 7% to 55% by weight of the ink.

* * * * *